Aug. 8, 1944.    J. DICHTER    2,355,280
SORTING MACHINE
Filed May 20, 1940

Inventor
JAKOB DICHTER

By *Allholcombe*
Attorney.

Patented Aug. 8, 1944

2,355,280

UNITED STATES PATENT OFFICE 2,355,280

SORTING MACHINE

Jakob Dichter, Berlin-Schoneberg, Germany; vested in the Alien Property Custodian Application May 20, 1940, Serial No. 336,307
In Germany March 31, 1939

1 Claim. (Cl. 209—82)

The present invention relates to apparatus for interiorly gauging cylindrical glass tubes, the necks of vials, and similar glass articles, and for sorting the articles to separate those having incorrect measurements from those the measurements of which are those desired for particular uses. Many glass receptacles in use at the present time are provided with internal screw threads to accommodate threaded closures, the latter being applied to the receptacles by machine. Other types of receptacles are closed by means of rubber plugs which may be forced inwardly of the receptacle to function as pistons and thus expel the contents therefrom. It is important that the diameters of the receptacles and the threads thereon be kept within predetermined limits to insure an accurate fit of the cooperating closures and plugs.

This invention has for one of its objects the provision of gauging devices designed to reject articles having incorrect dimensions and the separation thereof from articles having the desired predetermined measurements.

Another object of the invention is to provide conveying mechanism of such a character that it can be associated with glass shaping machinery now in use and permit gauging without removing the articles from the shaping apparatus to another machine.

Figure 1:
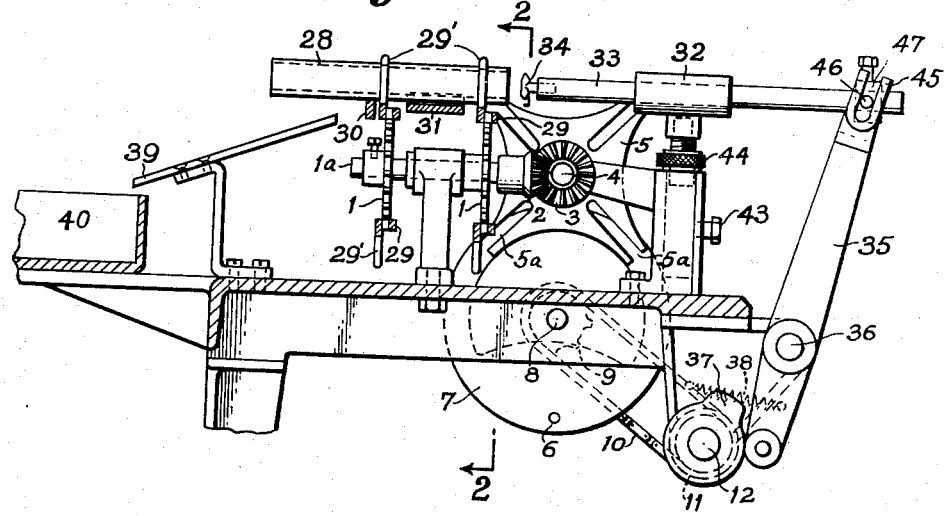
Figure 2:
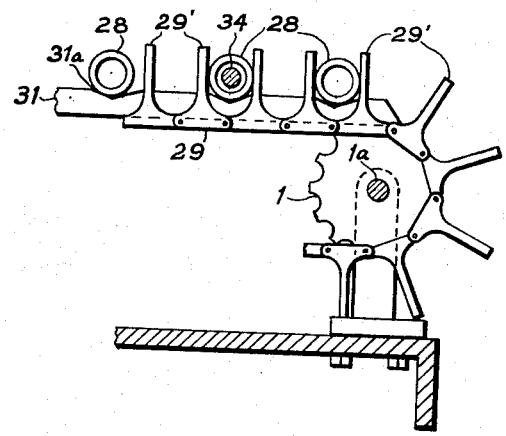

Other objects will be apparent from the following description of the invention taken with the accompanying drawing, in which Fig. 1 is a sectional view of the measuring apparatus, parts thereof being shown in elevation;

Fig. 2 is a sectional view taken along the line 2—2 in Fig. 1.

The disclosed mechanism is adapted for gauging interior threads as well as smooth interior surfaces, such as glass tubes, necks of vials and similar articles. A tubular vial 28 is so supported upon a notched trackway 31 that a slight movement of the vial in an axial direction will unbalance the blank and permit it to tilt, whereupon it will fall into a suitable receptacle. As illustrated in the drawing, a conveying means is provided comprising sprockets 1 upon which chains 29 are mounted, said means having pegs or fingers 29′ thereon. Preferably, the chain is driven intermittently by any suitable means such as a conventional Geneva gear. The intermittent driving connection shown, specifically comprises sprocket shaft 1a, beveled gears 2 and 3, shaft 4, star plate 5, plate 7, shaft 8, sprocket 9, sprocket chain 10, sprocket 11, and drive shaft 12. The drive shaft continuously rotates, thus continuously rotating plate 7, pin 6 and shaft 8. During a portion of each revolution of shaft 8, the pin 6 enters one of the slots 5a of the star plate, which in turn rotates star plate 5, shaft 4, gears 2 and 3, and shaft 1a, each a fraction of a revolution, to thereby cause the chains 29 to advance approximately the distance between adjacent notches 31a in bar 31. Although a conventional Geneva gear is provided for intermittently driving the conveyor, it is to be understood that other suitable intermittent drives could be employed without departing from the invention, because the intermittent drive per se is not a part of the invention.

The blanks are supported by a plate 30 and a notched bar 31, the notches 31a in the latter accurately positioning the blanks with respect to the gauging device. The latter consists of a gauge member 34 held in the reciprocable rod 33 slidable in bearing 32. The bearing is adjustable horizontally as well as vertically, set screw 43 and nut 44 being provided for this purpose. Lever 35 fulcrumed at 36 is adapted to be rocked by cam 37, spring 38 normally urging one end of the lever toward the cam. The other end of lever 35 is provided with a yoke 45 which cooperates with pin 46 on collar 47 which is adjustable on rod 33. When the chains 29 and tubes are at rest, the gauging member 34 is adapted to be moved by cam 37 toward the open end of tube 28 to gauge the same. Obviously, if the gauge member is larger than the internal diameter of the blank or tube, the latter will be moved axially until it tilts and falls onto slide 39, from which it falls into basket 40. If the gauge is smaller than the opening, the tube will not be affected, and therefore the tube will continue to roll from notch to notch to the end of the track along with the conveyor. In this manner, the blanks may be successively sorted into a plurality of sizes.

While a preferred form of the invention has been illustrated and described in detail, it is to be understood that the invention is not to be construed as being limited to the exact details shown, but may be modified within the terms of the appended claim.

What I claim as my invention is:

A machine for sorting elongated tubular bodies and the like with reference to a prescribed internal bore dimension, comprising an elongated track having a plurality of notches in the upper surface thereof for supporting the intermediate portions of said bodies, means for intermittently moving said bodies transversely of the longitudinal axes thereof along the upper surface of said track to a plurality of stations, said notches serving as a centering means for said bodies at said stations, and a gauging element associated with at least one of said stations, and means for reciprocating said gauging element in the axial direction of the bore in said centered body, said gauging element being of a size to enter said bore when the dimension of the bore is at least equal to said prescribed dimension, and to engage the adjacent portions of the tube when the bore is less than said prescribed dimension, whereby a tube having an undersized bore will be discharged from said track by said reciprocating gauging element.

JAKOB DICHTER.